(No Model.)
C. GOERSCH.
TREE PROTECTOR.
No. 531,113. Patented Dec. 18, 1894.
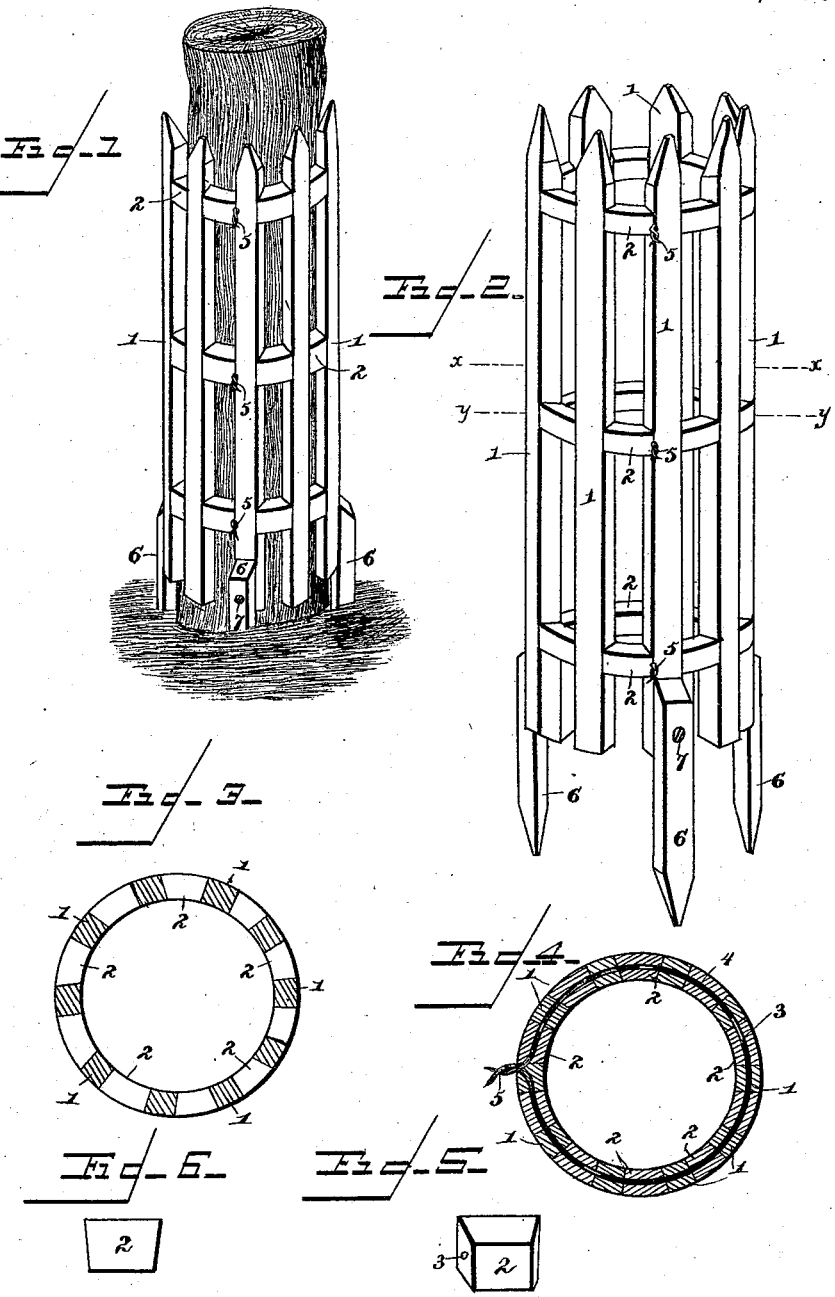
Inventor
Charles Goersch.
Witnesses,
By his Attorneys,

UNITED STATES PATENT OFFICE.

CHARLES GOERSCH, OF JEDDO, PENNSYLVANIA.

TREE-PROTECTOR.

SPECIFICATION forming part of Letters Patent No. 531,113, dated December 18, 1894.

Application filed July 10, 1894. Serial No. 517,114. (No model.)

*To all whom it may concern:*

Be it known that I, CHARLES GOERSCH, a citizen of the United States, residing at Jeddo, in the county of Luzerne and State of Pennsylvania, have invented a new and useful Tree-Protector, of which the following is a specification.

This invention relates to an improvement in that class of tree protectors which are formed of vertically-extending beams or bars joined to each other and adapted to embrace the trunk of a tree; and the invention consists in certain hereinafter described improvements whereby the protector is made capable of conforming to the shape of the tree with which it is used, and its sections held rigidly together and whereby the cheapness of its construction is increased.

In the drawings: Figure 1 represents a perspective view of my improvements, showing them applied to a tree as in practice; Fig. 2, an enlarged perspective of the protector, showing it detached from the tree; Fig. 3, a horizontal section taken on the line x—x of Fig. 2; Fig. 4, a similar section on the line y—y of Fig. 2; Fig. 5, a detail perspective of one of the spacing blocks for holding the vertical bars in their proper position. Fig. 6 is a plan view of one of the spacing blocks.

The reference numeral 1 indicates the vertical bars or rods of which the protector is composed, and these are arranged parallel with each other and equidistant apart. Located between the bars 1 are the spacing-blocks 2, which are trapezoidal in shape and which are so arranged that the rods or bars 1 will assume a circular form when their sides snugly engage the beveled ends of said blocks, as shown in Fig. 4.

Passed through longitudinal passages 3 in the blocks 2 are the securing-wires 4, which pass through the rods or bars 1, whereby the rods and blocks are connected to each other; and the ends of the wires 4 project slightly beyond the blocks and rods, so that they may be joined to each other, as shown in the drawings and as will be more fully described hereinafter.

The blocks 2 are arranged in three horizontal lines and are consequently of three series, there being a wire 4 for each series and passing through the same, as described above. The series of blocks 2 and wires 4 are arranged equidistant from each other throughout the vertical extent of the bars or rods 1, one series being located at or near the lower ends of the rods, a second series near the upper ends of the rods, and the third series at the middle thereof. By these means the positions of the rods 1 are maintained, and as they are tightened on the wires 4 the device will assume a circular form, owing to the shape of the blocks 2. One end of each of the wires 4 passes through the end bar 1 at the outer side thereof, rather than at the middle thereof, as would be the case if the course of the wire was kept.

The remaining ends of the wires pass through the end blocks 2 in a similar way, so that each pair of ends will be arranged at the outer side of the protector and in position to be joined to each other by twisting, as shown at 5 in the drawings.

6 indicates a series of legs, which are secured to the lower ends of the bars or rods 1 by the screws 7, which are one for each leg and which pass through the same and into the bars. By these means the protector is held above the ground and in position on the tree.

In the use of the invention, the joint 5 of the wires 4 is disconnected and the protector made to embrace the tree to be preserved, after which the ends of the wires 4 are joined by the twisting, as explained, and the legs 6 driven into the ground, said legs being formed pointed to permit this operation, as will be seen by reference to the drawings.

By means of the trapezoidally-shaped blocks 2 the protector is made to automatically assume the requisite form upon the tightening of the wires 4, since this tightening operation will cause the rods 1 to snugly engage the beveled sides of the blocks, which will dispose them circularly, as will be understood.

Having described the invention, I claim—

A tree protector consisting of a number of bars or rods rectangular in cross-section, extending parallel with each other and arranged in a circular line, a series of spacing blocks arranged in horizontal alignment and one between each pair of bars or rods, said spacing blocks being trapezoidal in shape and having their smaller ends arranged at the inner side of the protector, and a flexible wire passed through the blocks and through the bars or rods at points adjacent to the blocks, the wire being drawn tightly and fastened at its ends, whereby the bars or rods are forced to snugly and tightly engage the radially-extending sides of the respective blocks, and whereby the protector is made rigid in its circular form, substantially as described.

In testimony that I claim the foregoing as my own I have hereto affixed my signature in the presence of two witnesses.

CHARLES GOERSCH.

Witnesses:
WM. LOHT, Sr.,
BENJAMIN F. DRUM.